US006771330B2

(12) United States Patent
Moon

(10) Patent No.: US 6,771,330 B2
(45) Date of Patent: Aug. 3, 2004

(54) FLAT PANEL FLUORESCENT LAMP HAVING HIGH LUMINANCE

(75) Inventor: Jeong Min Moon, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 191 days.

(21) Appl. No.: 09/874,122

(22) Filed: Jun. 6, 2001

(65) Prior Publication Data

US 2002/0036459 A1 Mar. 28, 2002

(30) Foreign Application Priority Data

Sep. 25, 2000 (KR) ........................................ 2000-56211

(51) Int. Cl.[7] ............................................ G02F 1/1335
(52) U.S. Cl. .............................. 349/61; 349/65; 349/70
(58) Field of Search .............................. 349/61, 62, 64, 349/65, 68, 70

(56) References Cited

U.S. PATENT DOCUMENTS 5,143,433 A * 9/1992 Farrell ......................... 349/68
5,754,159 A * 5/1998 Wood et al. .................. 349/62
5,818,164 A * 10/1998 Winsor ........................ 313/493
6,011,602 A * 1/2000 Miyashita et al. ............ 349/65
6,288,700 B1 * 9/2001 Mori ........................... 349/62
6,491,411 B2 * 12/2002 Itoh ............................ 349/62
2002/0154258 A1 * 10/2002 Fujishiro et al. .............. 349/70

FOREIGN PATENT DOCUMENTS

KR 2000-0005671 1/2000
KR 2000-0049776 8/2000

* cited by examiner

*Primary Examiner*—John F. Niebling
*Assistant Examiner*—Walter L. Lindsay, Jr.
(74) *Attorney, Agent, or Firm*—Morgan, Lewis & Bockius LLP

(57) ABSTRACT

A flat panel fluorescent lamp includes first and second glass substrates coupled with each other, at least one discharge path formed in the second glass substrate, and at least one pair of electrodes formed at the discharge path.

22 Claims, 7 Drawing Sheets

FLAT PANEL FLUORESCENT LAMP HAVING HIGH LUMINANCE

This Application claims the benefit of Korean Application No. P2000-56211 filed on Sep. 25, 2000, which is hereby incorporated by reference.

BACKGROUND OF THE INVENTION

1. Field of the Invention

The present invention relates to a flat panel fluorescent lamp, and more particularly, to a flat panel fluorescent lamp providing high luminance as a light source.

2. Discussion of the Related Art

A cathode ray tube (CRT), one of display devices, is mainly used in monitors of information terminals and measuring instruments including a television. However, it was difficult for the CRT to actively adapt to miniaturization and lightweight due to its weight and size.

An LCD device having a thin and small size has been actively developed in order to substitute for such a CRT. Recently, the LCD device is used as a flat panel display device. Thus, a demand of the LCD device is increasing consistently.

Such an LCD device is based on an electric-optical characteristic of a liquid crystal injected within a panel. Unlike a plasma display panel (PDP) and a field emission display (FED), the LCD does not emit light in itself. In order to view a picture displayed in an LCD panel, a separate light source, i.e., a back light assembly for uniformly irradiating light into the display panel of the picture is required.

Conventionally, a tubular cold cathode fluorescent lamp has been used as a back light assembly for the LCD. The lamp may have a straight-line shape or may be bent to have an L shape, U shape, or W shape, depending on its application.

Such a back light assembly is divided into an edge light type and a direct type depending on the position of the light source against a display area. In the direct type back light assembly, a fluorescent lamp is mounted on the lower portion of a liquid crystal panel and a light-diffusion plate is mounted between the fluorescent lamp and the liquid crystal panel. In the edge light type back light assembly, light generated from the fluorescent lamp mounted at the side of the liquid crystal panel is distributed over the whole LCD screen using a transparent light-guiding plate.

A related art light-emitting lamp for an LCD will now be described with reference to FIG. 1 illustrating a structure of a related art direct type back light assembly.

As shown in FIG. 1, the related art direct type back light assembly includes a liquid crystal panel 11, a plurality of fluorescent lamps 13, and a light-diffusion plate 15. The fluorescent lamps 13 are formed at the rear of the liquid crystal panel 11 in a straight-line shape, or in a U shape or W shape, so as to supply light to the liquid crystal panel 11. The light-diffusion plate 15 is interposed between the fluorescent lamps 13 and the liquid crystal panel 11 and disperses light emitted from the fluorescent lamps 13 to uniformly emit the light.

In the aforementioned direct type back light assembly, light is generated from a light source mounted below the liquid crystal panel 11 to face the liquid crystal panel 11 and enters into the liquid crystal panel.

Meanwhile, FIGS. 2A and 2B show structures of a related art light-guiding plate type back light assembly. FIG. 2A shows a structure of a back light assembly for a notebook PC while FIG. 2B shows a structure of a back light assembly for a monitor.

Referring to FIG. 2A, the back light assembly for a notebook PC includes a lamp assembly consisting of a liquid crystal panel 21, a light-emitting lamp 23, and a lamp reflecting plate 25. The light-emitting lamp 23 and the lamp reflecting plate 25 are formed at the rear edge of the liquid crystal panel 21. The back light assembly further includes a light-guiding plate 27 mounted to uniformly emit light generated from the light-emitting lamp 23 and the lamp reflecting plate 25 on the entire surface of the liquid crystal panel 21. A reflecting plate 29 is attached at the rear of the light-guiding plate 27. A sheet such as a prism 31 and a light-diffusion plate 33 is mounted between the light-guiding plate 27 and the liquid crystal panel 21 to condense and diffuse the light generated from the light-guiding plate 27. The light-guiding plate 27 is inclined at the rear to have a thick thickness toward the lamp assembly. The light-emitting lamp 23 is a cold cathode tube fluorescent lamp or a hot cathode tube fluorescent lamp and converts an electrical energy to an optical energy by a sealing gas. At this time, the emitting light is ultraviolet light. It is necessary to convert the ultraviolet light to visible light because the ultraviolet light cannot be seen by eyes of a human being. To this end, an inner wall of a glass tube of the light-emitting lamp 23 is coated with a phosphor 35.

In the aforementioned light-guiding plate type back light assembly, the lamp reflecting plate 25 is separately attached regardless of the light-diffusion plate 33 or the reflecting plate 29 to reflect light emitted to the rear except for the front of the lamp upon the side of the light-guiding plate 27.

Meanwhile, referring to FIG. 2B, unlike the back light assembly of FIG. 2A, a lamp assembly consisting of a light-emitting lamp 23 and a lamp reflecting plate 25 is mounted at both rear edges. The back light assembly of FIG. 2B is similar to that of FIG. 2A other than the lamp mounted at both sides of a light-guiding plate 27 having a uniform thickness.

However, the related art fluorescent lamp has several problems in view of a recent tendency that an LCD is applied to monitors, TVs, and multimedia as well as a notebook PC.

First of all, it is difficult to obtain high luminance suitable for a large size screen. Also, since a light source unevenly exists, a display quality is degraded. In addition, it is difficult to obtain a thin and small size lamp when a display panel is large. Further, when an optical element that enhances optical efficiency, such as a prism sheet, is used for a TV or multimedia, a light-emitting angle characteristic is not good enough to be used in variety of areas.

SUMMARY OF THE INVENTION

Accordingly, the present invention is directed to a flat panel fluorescent lamp having high luminance that substantially obviates one or more of the problems due to limitations and disadvantages of the related art.

An object of the present invention is to provide a flat panel fluorescent lamp having high luminance, in which a thin and small size can be obtained and a uniform light source is provided to satisfy a wide light-emitting angle and high luminance.

Additional features and advantages of the invention will be set forth in the description, which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a flat panel fluorescent lamp includes first and second glass substrates coupled with each other, at least one discharge path formed in the second glass substrate, and at least one pair of electrodes formed at the discharge path.

In another aspect of the present invention, a liquid crystal display having a flat panel fluorescent lamp includes a liquid crystal panel having a liquid crystal filled therein, a light diffusion plate coupled to the liquid crystal panel, first and second glass substrates coupled to the liquid crystal panel, at least one discharge path formed in the second glass substrate, and at least one pair of electrodes formed at the discharge path.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
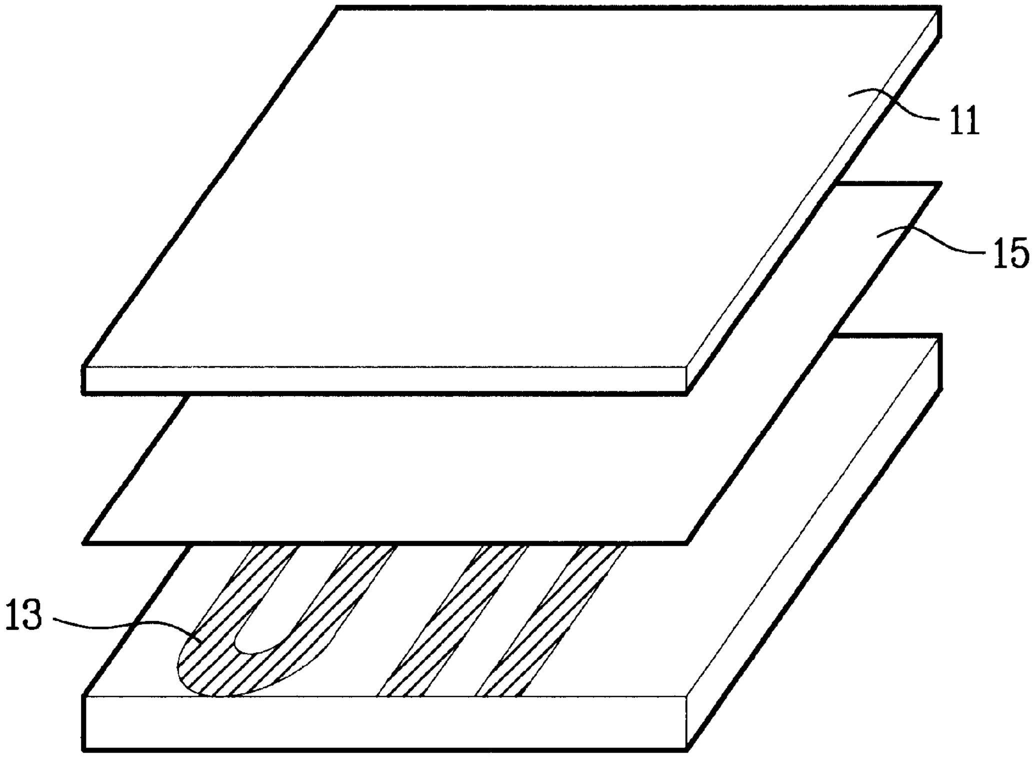
FIG. 1 Related Art
FIG. 1 illustrates a structure of a related art direct type back light assembly.
Figure 2A:
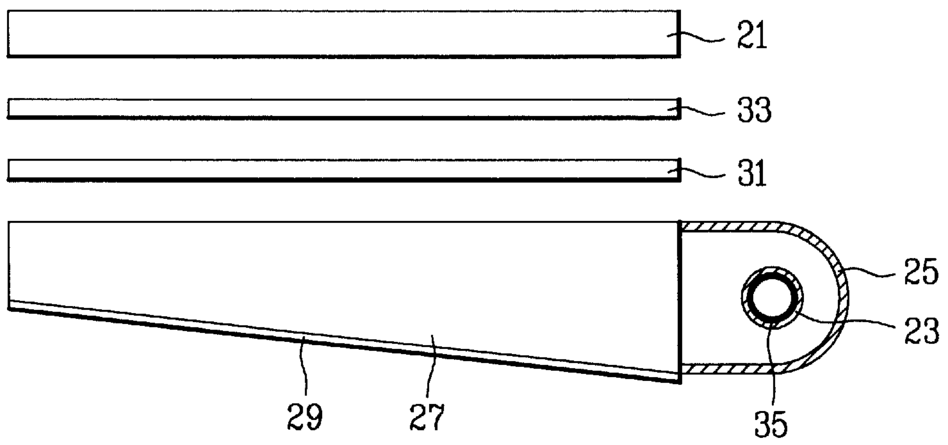
FIG. 2A Related Art
FIGS. 2A and 2B illustrate structures of a related art light-guiding plate type back light assembly.
Figure 2B:
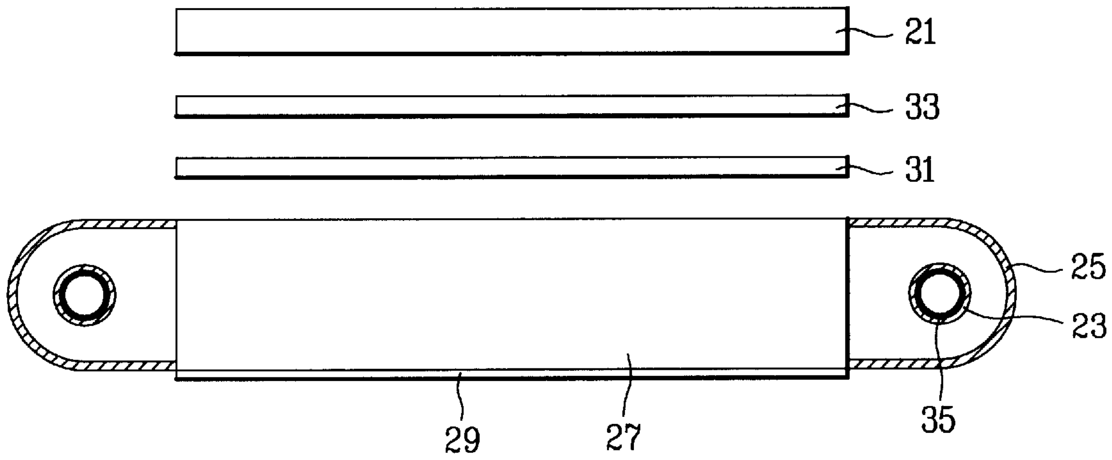
FIG. 2B Related Art
Figure 3A:
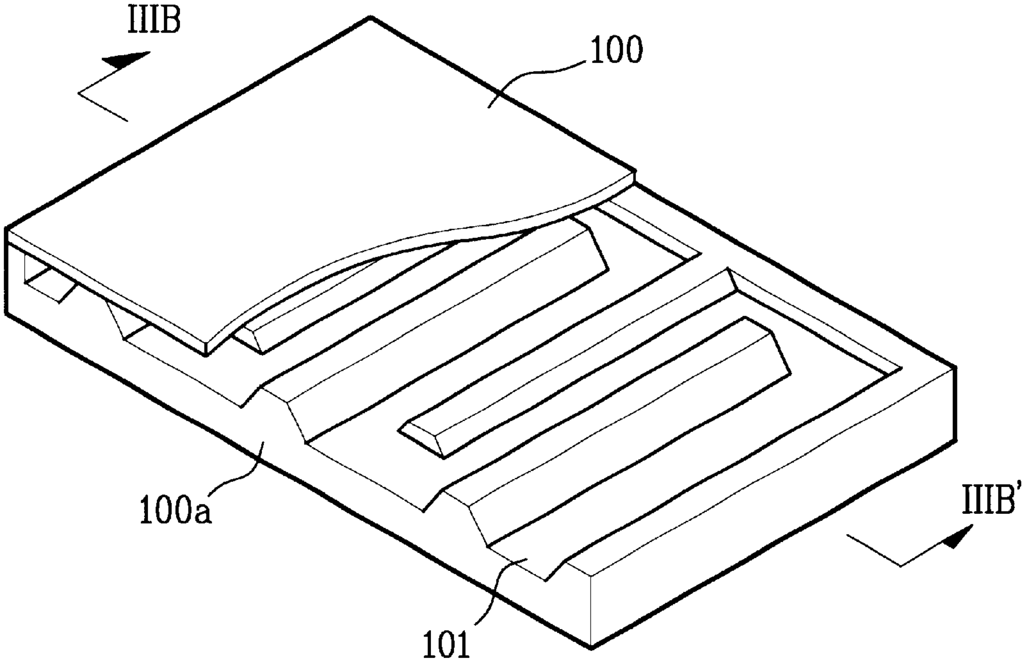
FIG. 3A is a plane view showing a flat panel fluorescent lamp according to a first embodiment of the present invention.
Figure 3B:
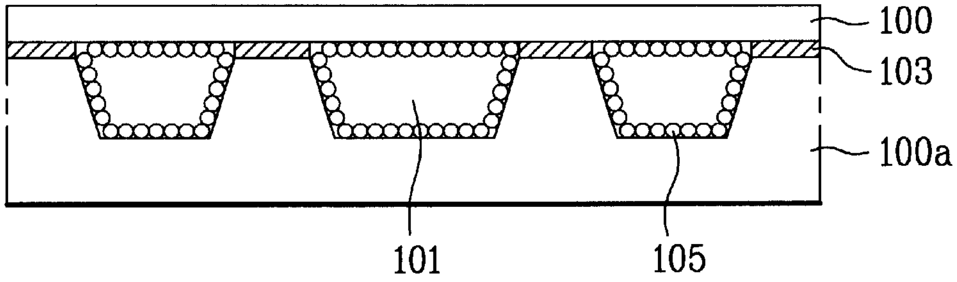
FIG. 3B is a cross-sectional view taken along with the line IIIB–IIIB' of FIG. 3A.

FIG. 3A is a plane view illustrating a flat panel fluorescent lamp according to a first embodiment of the present invention while FIG. 3B is a cross-sectional view taken along with the line IIIB–IIIB' of FIG. 3A.

As shown in FIGS. 3A and 3B in the first embodiment of the present invention, a discharge path is a polygonal shape in a straight line. More specifically, a flat panel fluorescent lamp according to the first embodiment of the present invention includes a first glass substrate 100, a second glass substrate 100*a* facing into the first glass substrate 100, and a plurality of discharge paths 101 formed between the first glass substrate 100 and the second glass substrate 100*a*. The discharge paths 101 have a tunnel shape having a first surface and a second surface.

The first surface has a flat or round shape. An electrode is formed at one side of the discharge path 101 and an opposing electrode is formed at the other side of the discharge path 101 to oppose the electrode (not shown).

The first glass substrate 100 and the second glass substrate 100*a*, as shown in FIG. 3B, are assembled with each other and sealed by a glass paste 103, so that the discharge path 101 is under vacuum and filled with a rare-earth gas.

The glass paste 103 of a silicon component is screen-printed and deposited on the corner portions of the first and second glass substrates 100 and 100*a* using a dispenser. Then, an organic material is removed by drying and sintering processes, so that the first and second glass substrates 100 and 100*a* are attached with each other.

A phosphor 105 is deposited within the discharge path 101 and on its inner wall to induce light-emission when the electrodes are electrically connected with each other. Meanwhile, the discharge path is formed on the opposing surface of the second glass substrate 100*a* against the first glass substrate 100.

Figure 4A:
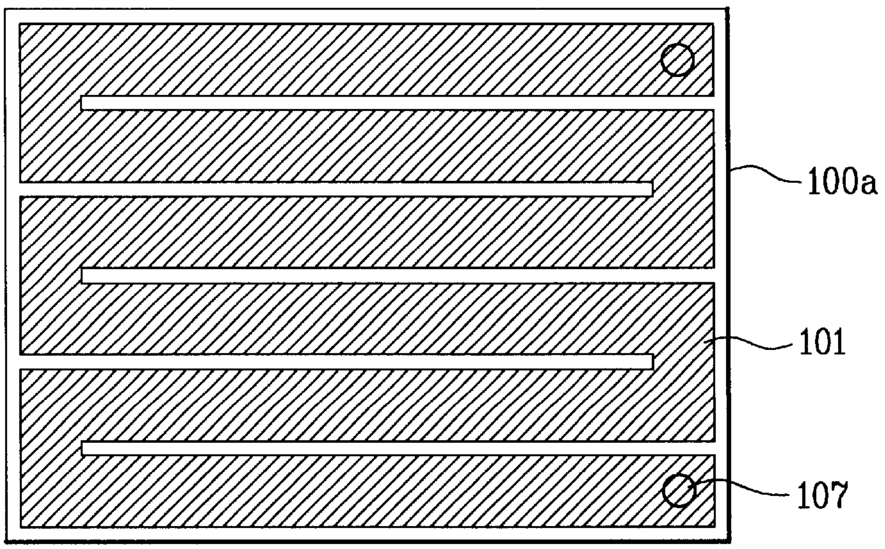
FIG. 4A is a plane view illustrating a light-emitting region according to the first embodiment of the present invention.
Figure 4B:
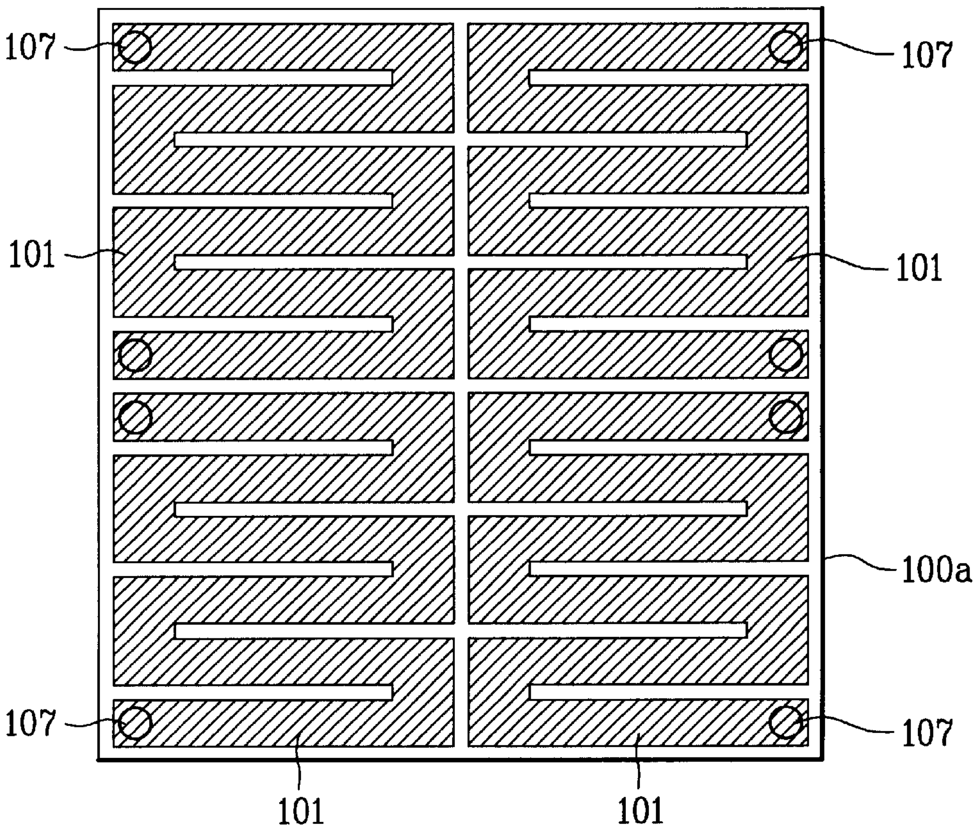
FIG. 4B is a plane view illustrating a light-emitting region according to a second embodiment of the present invention.

As shown in FIG. 4A, one light-emitting region with the same discharge electrodes is formed. Alternatively, as shown in FIG. 4B, a plurality of light-emitting regions with the separate discharge paths and separate discharge electrodes may be formed thereon. A reference numeral 107 denotes a discharge electrode.

A distribution of luminance depending on the position of the discharge path in accordance with the first embodiment of the present invention will now be described with reference to FIG. 5.

Figure 5:
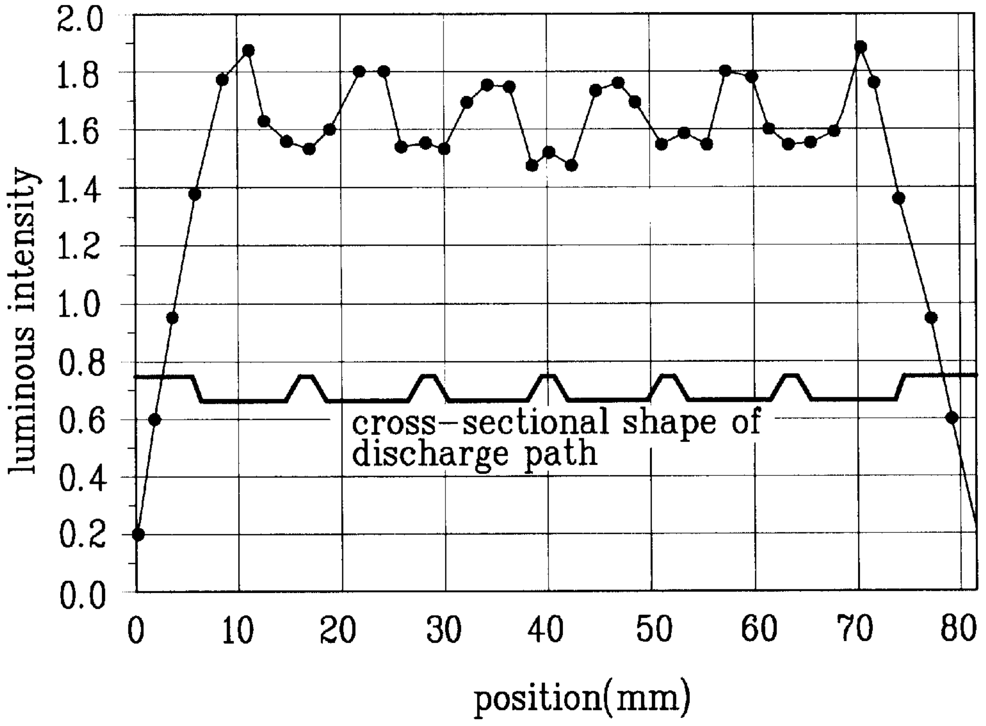
FIG. 5 illustrates luminous intensity with respect to the position of a flat panel fluorescent lamp according to the first embodiment of the present invention.

Supposing that the height of the discharge path is 3 mm, its width is 11 mm long and 8 mm wide, and the distance between the paths is 1 mm, the distribution of luminance is shown in FIG. 5.

In the first embodiment of the present invention, it is understood that some differences of luminance occur between the light-emitting region coated with the phosphor and a non-light-emitting region not coated with the phosphor.

Generally, a difference of brightness occurs between the portion coated with the phosphor 105 to emit light and the portion not coated with the phosphor 105 so as not to emit light. This seems that a dark stripe is formed within a flat light source. In this case, in the LCD device, it seems that a dark stripe is overlapped with an image of a screen.

Accordingly, it is necessary to minimize the difference of brightness between the light-emitting region and the non-light-emitting region, thereby improving uniformity of luminance. To this end, a method has been suggested for minimizing an area of the non-light-emitting region. However, there is a limitation in minimizing the area of the non-light-emitting region. Therefore, the shape of the discharge path can be deformed so as to minimize the difference of luminance between the light-emitting region and the non-light-emitting region.

Figure 6:
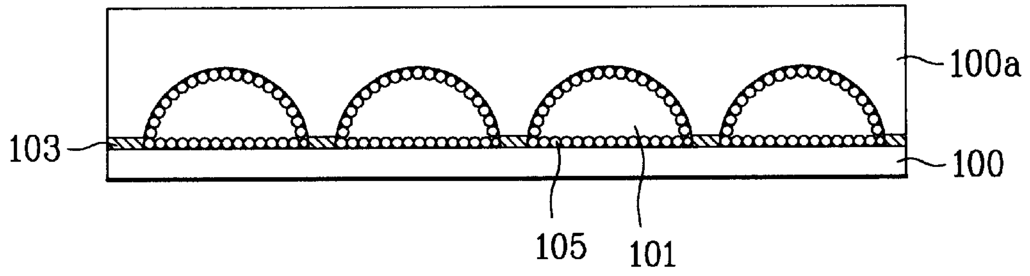
FIG. 6 is a cross-sectional view illustrating a flat panel fluorescent lamp according to the second embodiment of the present invention.

FIG. 6 is a cross-sectional view showing a flat panel fluorescent lamp according to a second embodiment of the present invention. As shown in FIG. 6, the flat panel fluorescent lamp according to the second embodiment of the present invention includes a first glass substrate 100, a second glass substrate 100*a* opposing the first glass substrate 100, and a plurality of discharge paths 101 formed to have a round shape on the opposing surface against the first and second glass substrates 100 and 100*a*.

The first glass substrate 100 and the second glass substrate 100*a* are joined with each other and sealed by a glass paste (not shown), so that the discharge path 101 is under a vacuum condition and is filled with a rare-earth gas. Further, a phosphor (not shown) is deposited within the discharge path 101 and on its inner wall to induce light-emission when electrodes are electrically connected with each other.

In the second embodiment of the present invention, an upper portion of the discharge path 101 opposing the first glass substrate 100 is formed to have a round shape, so that light is sufficiently emitted from a light-emitting region coated with the phosphor to a non-light-emitting region that is not coated with the phosphor. On other words, the upper portion of the discharge path 101 is formed to have a round shape to improve a light-emitting angle. Thus, light emitted by exciting the phosphor is emitted at a larger angle, so that a difference of brightness between the light-emitting region and the non-light-emitting region is minimized.

The distribution of luminance depending on the position of the discharge path in accordance with the second embodiment of the present invention will now be described with reference to FIG. 7. Supposing that the height of the discharge path is 3 mm, its width is 11 mm, and the distance between the paths is 1 mm, the distribution of luminance is shown in FIG. 7.

Figure 7:
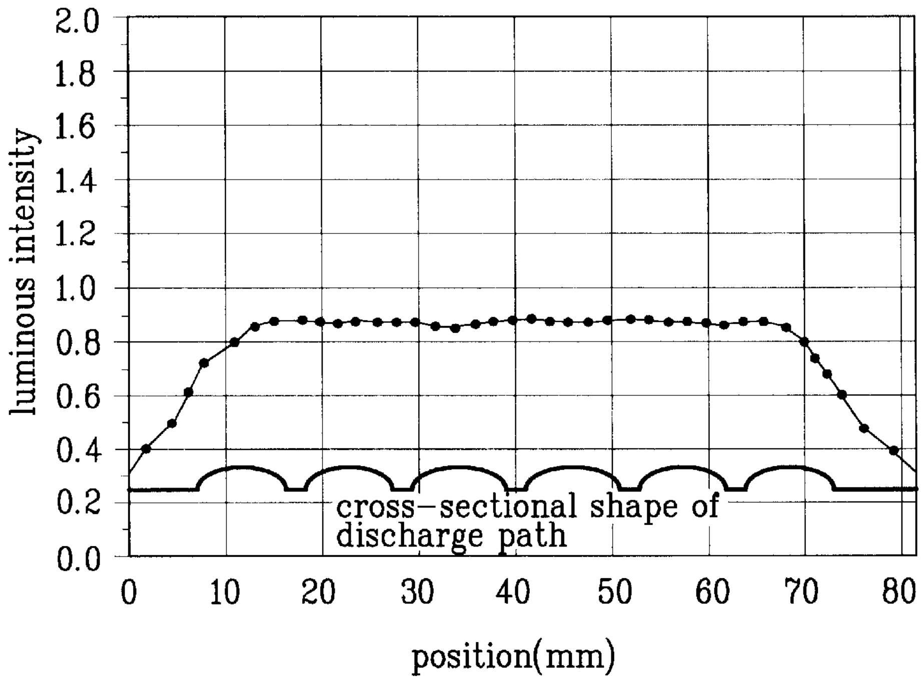
FIG. 7 is illustrates luminous intensity with respect to the position of a flat panel fluorescent lamp according to the second embodiment of the present invention.
Figure 8:
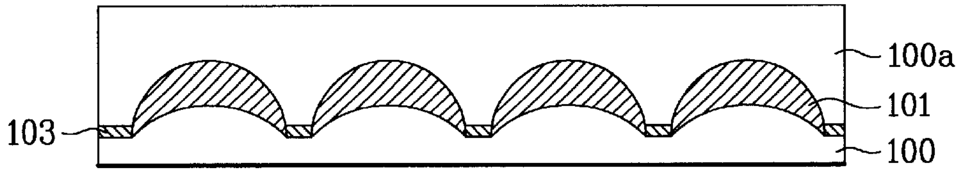
FIG. 8 is a cross-sectional view illustrating a flat panel fluorescent lamp according to a third embodiment of the present invention.

As shown in the graph of FIG. 7, it is understood that luminance becomes uniform between the light-emitting region and the non-light-emitting region as the upper portion of the discharge path has a round shape to improve the light-emitting angle. In view of the light-emitting angle, a lower portion of the discharge path may have a round shape. That is, as shown in FIG. 8, the upper and lower portions of the discharge path are formed in a round shape along a main travelling direction of light to improve the light-emitting angle, thereby improving a uniformity in luminance.

In addition, by forming the non-light-emitting region having no phosphor having a round shape, light is also emitted to the non-light-emitting region. Thus, the amount of light can be compensated to obtain uniform light in both the light-emitting region and the non-light-emitting region.

Figure 9A:
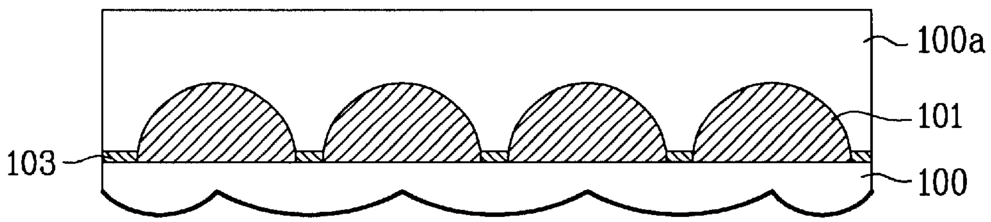
FIGS. 9A to 9B are cross-sectional views illustrating a flat panel fluorescent lamp according to a fourth embodiment of the present invention.
Figure 9B:
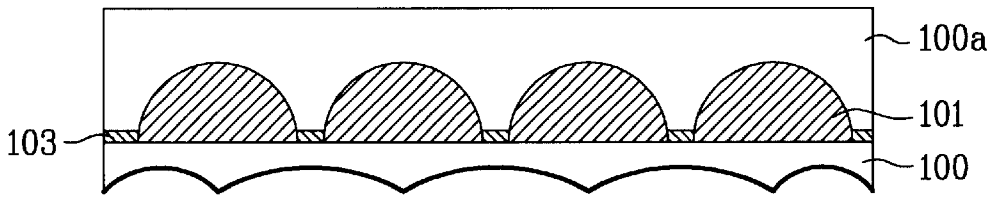

In other words, the lower portion of the non-light-emitting region without phosphor is formed to have a convex shape (shown in FIG. 9A) or a concave shape (shown in FIG. 9B), so that the light is emitted to the upper portion of the non-light-emitting region to obtain uniform light.

The aforementioned flat panel fluorescent lamp can variously be used if necessary, and more particularly, is suitable for an LCD back light. As aforementioned, the flat panel fluorescent lamp according to the present invention has the following advantages.

First of all, a light source having a uniform thickness can be obtained regardless of an area of the light-emitting region. Also, the light source has a wide light-emitting angle. In addition, a difference of brightness between the light-emitting region and the non-light-emitting region is minimized, thereby improving luminance. Further, the flat panel fluorescent lamp in the present invention provides a light source of high luminance.

It will be apparent to those skilled in the art that various modifications and variations can be made in the flat panel fluorescent lamp having high luminance of the present invention without departing from the spirit or scope of the inventions. Thus, it is intended that present invention covers the modifications and variations of this invention provided they come within the scope of the appended claims and their equivalents.

What is claimed is:

1. A flat panel fluorescent lamp comprising:

first and second glass substrates coupled with each other;

at least one discharge path having a round shape formed in the second glass substrate; and at least one pair of electrodes formed at the discharge path.

2. The lamp according to claim 1, further comprising a phosphor layer formed inside walls of the discharge path.

3. The lamp according to claim 1, wherein a cross-section of the discharge path is a polygonal shape.

4. The lamp according to claim 1, wherein a cross-section of the discharge path is a half-circle shape.

5. The lamp according to claim 1, wherein the first substrate has a first surface having a flat surface and a second surface having a concave or convex shape.

6. The lamp according to claim 5, wherein the first surface of the first glass substrate is coupled to a surface of the second glass substrate where the discharge path is formed therein.

7. The lamp according to claim 5, wherein the second surface of the first glass substrate is coupled to a surface of the second glass substrate where the discharge path is formed therein.

8. The lamp according to claim 1, wherein the discharge path is formed in the second glass substrate to substantially match the first glass substrate.

9. The lamp according to claim 1, wherein the first and second glass substrates are sealed with a glass paste.

10. The lamp according to claim 1, wherein the discharge path is filled with a discharge gas.

11. The lamp according to claim 10, wherein the discharge gas includes a rare-earth gas.

12. A liquid crystal display having a flat panel fluorescent lamp, comprising:

a liquid crystal panel having a liquid crystal filled therein;

a light diffusion plate coupled to the liquid crystal panel;

first and second glass substrates coupled to the liquid crystal panel;

at least one discharge path having a round shape formed in the second glass substrate; and at least one pair of electrodes formed at the discharge path.

13. The display according to claim 12, further comprising a phosphor layer formed inside walls of the discharge path.

14. The display according to claim 12, wherein a cross-section of the discharge path is a polygonal shape.

15. The display according to claim 12, wherein a cross-section of the discharge path is a half-circle shape.

16. The display according to claim 12, wherein the first substrate has a first surface having a flat surface and a second surface having a concave or convex shape.

17. The display according to claim 16, wherein the first surface of the first glass substrate is coupled to a surface of the second glass substrate where the discharge path is formed therein.

18. The display according to claim 16, wherein the second surface of the first glass substrate is coupled to a surface of the second glass substrate where the discharge path is formed therein.

19. The display according to claim 12, wherein the discharge path is formed in the second glass substrate to substantially match the first glass substrate.

20. The display according to claim 12, wherein the first and second glass substrates are sealed with a glass paste.

21. The display according to claim 12, wherein the discharge path is filled with a discharge gas.

22. The display according to claim 21, wherein the discharge gas includes a rare-earth gas.

* * * * *